Nov. 23, 1965   J. W. MANN ETAL   3,219,787
PROCESS AND APPARATUS FOR HEATING DIELECTRICS IN HIGH
FREQUENCY EXTENDED TOROIDAL ELECTRODE CONFIGURATIONS
Filed April 8, 1963

INVENTORS
JULIUS W. MANN
GEORGE F. RUSSELL
BY William R. Piper
ATTORNEY

United States Patent Office 3,219,787
Patented Nov. 23, 1965

3,219,787
PROCESS AND APPARATUS FOR HEATING DI-
ELECTRICS IN HIGH FREQUENCY EXTENDED
TOROIDAL ELECTRODE CONFIGURATIONS
Julius W. Mann and George F. Russell, both of
711 St. Helens Ave., Tacoma, Wash.
Filed Apr. 8, 1963, Ser. No. 271,410
6 Claims. (Cl. 219—10.41)

This case is a continuation-in-part of our application filed January 31, 1961, Serial No. 86,234, on a Process of and Apparatus for Heating Dielectrics in Extended Toroidal Electrode Configurations, now abandoned.

The present case pertains to treating dielectric materials within the convolutions of a toroid or extended toroidal electrode configuration on which half or full waves have been impressed by associated means of generating high frequency alternating currents. This is a manner similar to that described in our Patent No. 2,856,296, issued October 14, 1958, and entitled "Process of Heating Dielectrics by Extended Toroidal Electrodes," but wherein the structure of the extended toroidal electrodes differs therefrom, and improvements and other modifications have been made in the process and apparatus set forth in the above-mentioned patent.

In the above patent we show the ends of a full wave extended toroidal electrode configuration galvanically connected together and the high frequency alternating current source of energy being applied to the extended toroidal electrode configuration at approximately a mid-convolution to impress a radio frequency standing wave on the toroidal configuration. We describe that in such a structure the extended toroidal electrode would have low voltage or ground potential area of the standing waves resident thereupon at the ends and at the approximate center of the toroidal structure and would therefore have intermediate high voltage standing wave areas approximately one-quarter of the distance in from each end of the structure. In the above patent we state further a single full standing wave of radio frequency energy as being impressed on the structure and which produced four K spot areas of high heating within the convolutions of the toroid, two of these areas being substantially one-eighth of the distance of the length of the extended toroidal structure in from both ends of the structure and the other two areas being substantially one-eighth of the distance from both sides of a theoretical center point of the said structure. The mode of standing wave oscillating resident upon the extended toroid with reference to full wave structure in this case is similar to the mode described as the one existing on the structure described in the above-mentioned patent. We described the axis of the convolutions of the extended toroidal electrode configuration as one constituting approximately a straight line and similarly in this case the structures described in connection with an extended toroidal electrode configuration possess a similar characteristic.

A substantial difference between the instant application and the patent cited is that we have found that the ends of a full wave extended toroidal electrode configuration need not necessarily be galvanically connected together as in the full wave structure described in the above-mentioned patent in order to impress a full standing wave radio frequency mode thereupon. Further, we have invented the means of impressing radio frequency half standing waves on an extended toroidal electrode configuration in a manner compatible to supplying it with energy from an associated source of heating high frequency current. We have invented means therefore of modifying the structures set forth in the above-mentioned patent so that modes of radio frequency standing wave oscillating can be impressed more easily upon an extended toroidal electrode structure and which modification facilitates its being made to conform resonance-wise with the frequency of oscillating in an associated means of generating high frequency alternating currents. We have found also that the terminal extremities of an extended toroidal electrode configuration as described in the above-mentioned patent need not necessarily have a direct galvanic connection by the use of spacings and other configurations utilizing the Maxwell displacement current philosophy, as a major potential.

In the present case we show modifications of the previously disclosed full wave extended toroidal electrode therefore with galvanic end connections and herein show our invention of half wave, dual half wave and full wave structures connected together in differing ways and fed in differing manners as well from the associated source of high frequency alternating current with which the structures are associated and generally speaking are resonant therewith.

Other advantages will appear in the following specifications and the novel features of the process will particularly pointed out in the appended claims. In the specification also will be pointed out means which have been developed for more exactly determining the size, shape, design and length of the extended toroidal electrode configurations disclosed herein so that facility of operation is gained. The process and structure herein claimed are novel and have not been disclosed by any others or in the above-mentioned patent by ourselves as co-inventors thereof and constitute new and useful process and device which have commercial value and great novelty.

*Drawing*

Our invention is illustrated in the accompanying drawing forming a part of this specification in which:

FIGURE 1 is a view of a full wave extended toroidal electrode configuration with its extremity convolutions connected by a low inductance connector and the convolutions in the center of the said toroid not galvanically connected, but forming a feed from an associated means of generating high frequency alternating current of a desired wave length as from a dual ender type electronic generator.

FIGURE 2 illustrates an extended toroidal electrode configuration with its respective ends not galvanically connected, but composing two end adjacent halves galvanically connected at their closest points of approach and with their respective ends galvanically connected which galvanic connection to each of the respective halves forms a means for feeding high frequency alternating current from an associated means of generating such currents at a desired frequency, and imposing upon the entire structure a full standing wave of radio frequency energy composing in effect two adjacent half waves connected at a respective common "i" field boundary area.

FIGURE 3 illustrates a half wave extended toroidal electrode configuration in which the ends are galvanically connected together and from such a point impressed with a half standing wave of radio frequency energy from an associated means of generation of such high frequency alternating currents at a desired frequency, the common galvanic connection from the extremities of the said half wave extended toroidal electrode configuration forming a link to such source of alternating current generation as might be supposed from a single ender configuration, but feeding from the "i" field boundary area of such associated means of generation.

FIGURE 4 illustrates an extended toroidal electrode configuration composed of two half wave structures such as are illustrated in FIGURE 3, and are aligned so that their axes form substantially a straight line and one extremity of each being placed adjacent to an extremity of the other, they are not aligned so as to be connected at a common "$i$" field boundary point as illustrated in FIGURE 2, but have no galvanic connection in such "$i$" field area, the said dual half wave extended toroidal electrode structures each end of which separate structures are galvanically connected form means of attachment to an associated source of high frequency alternating current which impresses a single full standing wave mode upon the entire structure, a half standing wave mode on one of the structures and another half standing wave mode on the opposite structure.

While we have shown only the preferred forms of our invention, it should be understood that various changes or modifications, particularly with reference to the spacing as between the adjacent halves of the configurations in FIGURES 1, 2 and 4, and in connection with other moderate alternate devices in design, may be made within the scope of the appended claims without departing from the spirit thereof. Variations are not limited to the spacing of the sections of the extended toroidal electrode above mentioned, but may be variations such as between the feeds from a single ender or double ender electronic generator, the spacing between the electrode itself and any surrounding means of enclosure, the diameter of the convolutions of the said structures and within limits further described below the length of the structures along the convolutions thereof.

Detailed description

Our invention disclosed and claimed herein can be applied to practically all dielectric materials, solids, semisolids, gases, plasma and liquids of various chemical compositions. The disclosure and discussion herein undertaken of specific examples are not intended to limit the use of the process or apparatus described to any single dielectric or class of dielectrics, however, but can be generally described as non-conductors except in the case of ionized gases which may, in some states of the art, be considered as semi-conductors or conductors. It is intended herein, however, that gases whether in a rest state or in an excited state will be classed as dielectrics. Our invention is concerned with the method of applying to a dielectric matter as described, the effect of a high frequency alternating current field of force, the source of which is a generator of such currents. The high frequency generator, which may be employed to accomplish the ends of the herein described invention, may be of the type shown in our Patent No. 2,506,158, issued May 2, 1950, and entitled "Single Standing Wave Radio Circuit," but it may be as well any of several types including the so-called single ender types, well known in the art.

Figure 1:
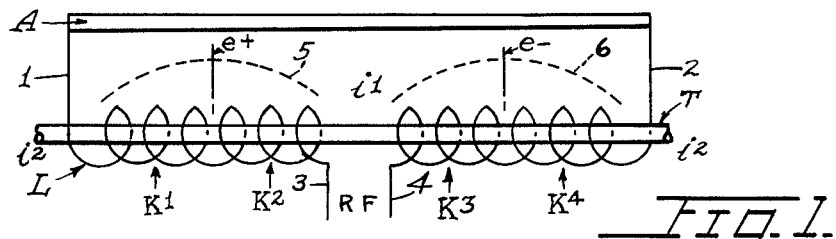
Figure 2:
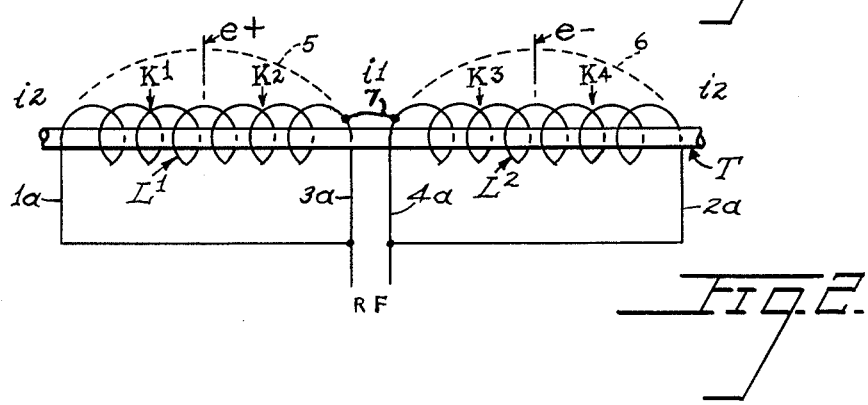

In one form of our invention, as disclosed in FIGURE 1, we indicate the opposite ends 1 and 2 of a dual half wave extended toroidal electrode configuration L as being galvanically connected together by a low inductance connector A. In FIGURE 2, another form of our invention is illustrated and the current antinodal "$i1$" and "$i2$" field point terminations of each separate "$e$" field half standing wave area are galvanically connected together by wires $1a$ and $3a$ that galvanically connect the ends of the toroid section L1, together, and by wires $2a$ and $4a$ that galvanically connect the ends of the toroid section L2, together. The inner extremity of each toroid section L1 and L2 are connected galvanically at their closest adjacent convolutions. They are not, however, galvanically connected by specific inductance means at their respective outer extremities as in FIGURE 1.

FIGURE 1 illustrates the dual extended toroidal electrode L with its extremities 1 and 2 galvanically connected by the low inductance connector A. The common "$i1$" field center of the dual extended toroidal appears to form two separate helices. The inner ends 3 and 4 of the two helices are wires that are connected to a source of high frequency alternating current, such as the radio frequency generator disclosed in our Patent No. 2,506,158. A ground potential area "$i1$" is shown at the point of connection with the radio frequency generator indicated by the letters R.F. Second ground potential areas "$i2$" are shown at the outer ends of the extended toroidal electrode L which appears by structure to be two separate halves. A maximum voltage potential charge area "$e+$" is disposed approximately mid-way between the common center "$i1$" field area of the dual half wave extended toroidal electrode L and the left hand extremity of the toroid, this being the electrical center of a half standing wave indicated by the arcuate dotted line 5. A second maximum but instantaneously opposite voltage potential area "$e-$" charge is disposed approximately mid-way between the common "$i1$" field center and the right hand extremity of the toroid L, this being the electrical center of another half standing wave indicated by the arcuate dotted line 6. The extended toroidal electrode L, therefore, has two half waves 5 and 6 of a single full standing wave of radio frequency energy impressed thereon. Although the two half waves of "$e$" field charge, or voltage gradients are indicated by the dotted arcuate lines 5 and 6 in FIGURE 1, these show only the voltage components. For convenience they are drawn on top of the diagram, but normally one would be illustrated as 180° out of phase or on the opposite side from its adjacent half wave. The current antinodal positions standing on the full standing wave extended toroidal electrode configuration are respectively at the positions marked "$i1$" and "$i2$" in FIGURE 1.

The full standing radio frequency wave introduced on the toroid L by the generator RF in FIGURE 1, associated as the radio frequency source will create four maximum heat producing spots or areas indicated at K1, K2, K3 and K4. It will be noted that the four K spots are located between the "$i$" and the "$e$" areas in FIGURE 1, two K spots for each half standing wave. In our Patent No. 2,856,296, the reason for this has been described and FIGURES 3, 4 and 5 of that patent illustrate the theories involved. It is certainly unnecessary to set forth here all of the data presented in the above-mentioned patent although the extended toroidal electrode L in this case will function in a similar manner. The disclosure made in this patent and pertaining to FIGURES 3 through 5 inclusive and the description in connection therewith are made a part of this case. We wish also to include in this case reference to FIGURE 1 of Patent No. 2,856,296 in that it discloses a toroidal electrode coil on which reside two half standing waves of instantaneously opposite charged "$e$" fields of radio frequency energy and shows "$i1$" and "$i2$" to be the current antinodal boundary area between the respective "$e$" field positions. Toroidal extremity connections and radio frequency feed points may be the same as for the corresponding convolutions when they are extended as in FIGURES 1, 2, 3 and 4 of the instant case.

The axes of the convolutions of the extended toroidal electrode coils as shown in the four figures of this case are approximately straight lines, although they may be curved, circular, arcuate or take other form. The ends of the extended toroidal electrodes are intended to be kept at a low electric field potential in the standing wave mode for the convenience of the entrance and egress of dielectric materials toward and away from the standing wave electric field charges standing on the extended toroidal electrodes. Dielectrics, not shown, can enter the extended toroidals from the extremity positions at either end of the convolutions of any of the structures shown in the four figures in this case at approximately zero electric potential and then the dielectric can pass progressively through the high "$e$" field charge areas in progression, finally emerging from the opposite extremity. At the two extremities 1 and 2 of the extended toroidal electrode of FIGURE 1, and the two extremities $1a$ and $2a$ of FIGURE 2, the "$i2$" fields will remain at approximately zero potential. Also the electrical centers of the two toroids in these two figures and shown at "$i$" will remain approximately at zero potential in the standing wave field mode herein presented. There will be little electric strain between the dielectric and the extremity of the toroid as the dielectric enters the helix. Only after the dielectric enters the toroid does the standing wave field of force build up to a maximum at the points "e+" and "e—". This applies, of course, to any dielectric introduced into the configuration either under movement or stationary. In the case of gases if a tube is used as a carrier within the convolutions, this principle applies also. Where no conductor such as a tube is employed, the gas may be ionized in and around the configuration of the extended toroid itself as where the entire structure is inside of an outer conductor and the atmosphere is reduced below pressure normally experienced at sea level.

The extended toroidal electrode form is not to be limited to any certain size or cross section, but may be varied widely in dimension as the need arises for adaptation to a dielectric work load of a particular type or size, and further may consist of one or more sections, the radio frequency energy being fed in a variety of ways from an associated means of generating high frequency alternating current.

As has been pointed out the dimensions of diameter, length and convolution spacing as well as frequency of response may vary widely in the application of an extended toroidal electrode, dependent upon the various uses to which the toroid may be adapted to accommodate the process of materials of different size, composition, shape and heating requirements.

We have invented a means of determining the approximate length of the conductor that composes an extended toroidal electrode configuration upon which a full standing wave of radio frequency energy may be impressed whether the axes of the convolution of which are in line, arcuate, circular or in other form and that length will generally be approximated by the formula: The square root of 2 times the calculated free space wave length of the frequency being employed in the radio frequency generator source associated with the structure. In the circumstances such as FIGURE 3 where a half wave is resident only upon an extended toroid of one half a wave, then the length of the convolutions of the structure may be calculated by a further division by two. Extraneous variables will affect the length of the conductor modifying the formula by addition or subtraction, but generally by subtraction in the case of heavy loads intended to be processed within the convolutions of the extended toroid. As much as the equivalent to 1/8 of the calculated length of an equivalent free space wave length may be deducted from the formula length above set forth where loads of heavy type are placed within the convolutions of the toroid such as flowing milk, water, beer or other liquids for pasteurizing purposes, these liquids flowing in conduits that extend lengthwise through the extended toroidal electrode configuration. Each dielectric depending upon its volume and electrical characteristics is one of the influences which effects the overall length of a configuration such as that which is here disclosed. Light loads, on the other hand, may dictate that the full or even a slightly greater formula length be employed. Other factors such as the proximity of the surrounding radio frequency shielding means, the physical length of the radio frequency feed lines, and proximity of trimming capacitance and the spacing of the convolutions may all modify the above formula ratios to a modest proportion.

In FIGURE 2, the extended toroidal electrode may be formed of two separate coil sections L1 and L2, but it may also be in the form of a single long coil wherein a continuity of convolutions has outer extremities 1a and 2a and the center portion has a galvanic connection, 7, interconnecting the coils which may be one or more convolutions of the toroid itself or take other form.

Leads 3a and 4a lead from the inner ends of the coil sections L1 and L2 and are connected to a radio frequency generator indicated at RF in FIGURE 2. The lead 1a is connected to the lead 3a while the lead 2a is connected to the lead 4a. The extended toroid of FIGURE 2 will function in a manner similar to and have field patterns thereupon the same as the patterns on the extended toroidal electrode configuration shown in FIGURE 1. The length of any connector, 7, between leads 3a and 4a, if the two halves or sections L1 and L2 consitute separate helices will generally be short in relation to the length of either half.

In accordance with the fundamental law of Maxwell, "A changing electric field produces a changing magnetic field, and vice versa, a changing magnetic field produces a changing electric field." The standing wave system such as described herein, existing in and upon an extended toroidal electrode configuration has displacement currents which maximize at the current antinodal areas or boundaries of the system such as at "i1" and "i2" of FIGURE 2, and also as in FIGURE 1. Customarily this portion "i1" is composed of some low resistance such as a metallic connector, 7, in FIGURE 2. However, under certain circumstances such a galvanic path may be removed entirely as at "i1" in FIGURES 1 and 4 and Maxwellian displacement currents bridge the central gap instead with no great change visible or apparent from the original wave pattern established on a system with such a galvanic connection as at 7. There are, of course, limits between the spacing of two adjacent terminal convolutions or helices from each other in an extended toroidal electrode configuration, but the spacing may be determined for best results by cut and try. The effective spacing of the two inner K spots such as K2 and K3 on the heating of the dielectric within the convolutions of such an extended toroidal electrode may be placed in accordance with the desired end results when spacings between the adjacent ends of the sections L1 and L2 are increased or decreased. For this reason either the center "i1" field or current antinodal convolutions are as shown in FIGURE 1 while placed adjacent to each other or continuity of convolutions as employed as in FIGURE 2, shown by connection 7, the heating patterns inside the convolutions at the respective K spot areas of heating in either system are similar and may be preserved or varied as desired.

Figure 3:
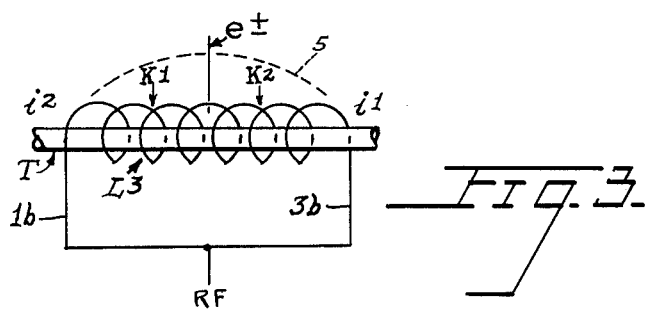
Figure 4:
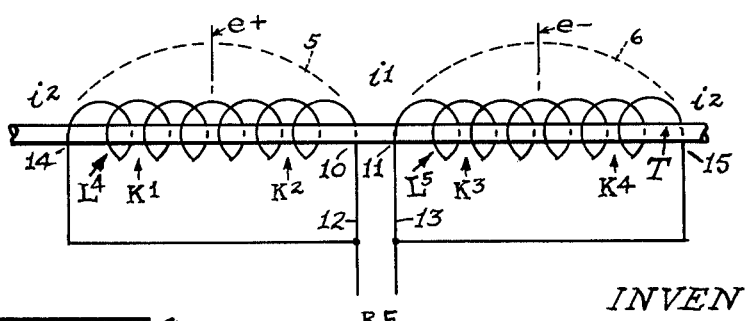

Field lines of force employed upon and within the convolutions of an extended toroidal electrode upon which there is resident a full standing wave of radio frequency energy as in FIGURES 1, 2 and 4, are substantially the same as shown in FIGURE 3 of our Patent No. 2,856,296.

The toroid L3 of FIGURE 3 will have two K spots shown as K1 and K2. Dielectrics, not shown, can be passed through the toroid L3 and will be heated in a manner similar as to areas as if they were passed through the sections L4 and L5 of the extended toroidal electrode configuration shown in FIGURE 4. In our Patent No. 2,599,850, issued June 10, 1952, on the "Process of Controlling and Placing Radio Frequency Heat in a Dielectric," we disclose a two spot heating effect in an electric standing wave field. That patent generally describes the phenomena in a condenser field having an entirely different mode than the circular field herein described, but having a half wave field nonetheless. While the disclosure herein describes a half wave, to be true, but as pointed out above in a different mode as described here a circular or elongated state, the areas of heating or K spots will be sequential through a half wave along a theoretical line which might constitute the axis of the convolutions of the coil making up the extended toroidal electrode configuration.

The field patterns of FIGURE 3 are similar to either half of the field patterns developed for the structures of FIGURES 1, 2 and 4; but its structure and galvanic connection between "i1 and "i2" however, is similar to a condition of structure of coil L5 of FIGURE 4. If lead 2 of FIGURE 1 were disconnected from galvanic connector A and joined with lead 4, as though it (lead 2) were brought directly down below the right hand half of the helix and joined to lead 4 of FIGURE 1 the equivalent of the structure set forth in coil L5 of FIGURE 4 would also be noted.

In the present case during any build up or collapse of the charge during the alternating current cycle, the two so-called half sections of the extended toroidal electrode configurations of FIGURES 1, 2 and 4 respectively will contain oppositely charged electric field standing half wave areas, one section appearing as a positive "e" field charge and the other as a negative "e" field charge area, there will appear two K spot heating areas in each such half wave section, making four K spot heating areas in all for a complete full standing wave. The extended toroidal configuration illustrated in FIGURE 3, however, has only a single half standing wave of radio frequency energy residing thereupon and therefore only two K spot areas of high heating effect K1 and K2, will appear where the electric field build up and collapse alternates between positive and negative half cycles but where the area of the respective "e" field charges remains at the same standing wave position, as shown in the illustration.

An extended toroidal electrode configuration system excited by means of a compatible and resonant frequency from an associated source of high frequency alternating current can be composed of one or more sections such as L3 in FIGURE 3, on each of which a half-standing wave of radio frequency is impressed. Such a half-standing wave expressing the "e" field charge gradient only in FIGURE 3 is indicated by the dotted line 5. In FIGURES 1 and 2 the same "e" field gradient line is also represented by the dotted line 5 on one half of the structure while the opposite phase half wave of the structures of the same figures, show the corresponding gradient on the opposite phase of the "e" field half wave as represented by the dotted gradient lines 6.

In the half wave extended toroidal section L3 of FIGURE 3, the high potential area "e+" and "e−" reside at the center of the section and in like manner the low potential or high current areas "i1" and "i2" reside at the approximate ends 1b and 3b of the section. A galvanic connection between the extremities of the toroid section L3 and this, as has been stated above, connects the feed point to the associated source of high frequency alternating current of any compatible single or double ender type.

The extended toroidal coil L1 of FIGURE 2 may be also connected to a single or double-ender or push-pull type RF generator. The dominant electric and magnetic fields are inside of the convolutions of the toroid which fields are patterned from the mode resident upon the convolutions of the said extended toroidal electrode configuration. We have stated that the dominant fields are inside of the convolutions rather than outside, but we should further indicate that field lines also extend outside of the convolutions as well as inside, our meaning intending to convey the fact that the more concentrated are the lines of force within the convolutions rather than outside of them. A unique property of the invention is that strong fields of force may be established primarily inside of the convolutions and that the "e+" and "e−" relationships of the full standing wave are in a full standing extended toroidal electrode, as if along the axis within the convolutions of the structure and substantially more concentrated there than they are on the outer periphery of the structure.

By exciting a dual half wave system by means of the proper frequency of oscillation of the associated means of generating alternating currents as in FIGURE 4, the two extended coiled sections L4 and L5 do not have at their adjacent convolutions 10 and 11, a connection 7, as in FIGURE 2, but placement in proximity to each other permits reaction by Maxwellian displacement currents to make the whole appear as a full standing wave mode of radio frequency energy. The sections L4 and L5 are so sized that each has a half-standing wave of radio frequency energy impressed thereupon; these one-half waves being indicated at 5 and 6. Only illustrated, however, is the "e" field components. The mid point of the section L4 would have a high potential "e+," while the mid point of the section L5 would have a high potential "e−." There would be a low potential area "i1" at the interior ends of the sections L4 and L5 and there would be two low potential areas as well at "i2" at the outer ends 14 and 15 of the two sections respectively.

A virtual electromagnetic field in this electrode substitutes for galvanic connections heretofore described. The extended toroidal electrode L4 and L5 of FIGURE 4 functions in the same manner as the extended toroidal electrode configurations in FIGURES 1 and 2 and contains similar field patterns. In the extended toroid of FIGURE 4 functions in the same manner as the extended toroidal electrode configurations in FIGURES 1 and 2 and contains similar field patterns. In the extended toroid of FIGURE 4, the radio frequency energy may be applied at the interior ends 10 and 11 of the toroid sections, but so that symmetry is preserved a convenient point on the galvanic connecting means between ends 10 and 14 and 11 and 15 is usually employed. There is no galvanic connection between the adjacent convolutions of the sections of coils L4 and L5, respectively in FIGURE 4 as contrasted to the center galvanic connection 7 between the half sections L1 and L2 of FIGURE 2. There are, however, two K spots of heat energy in the standing wave of section L4 and these are indicated at K1 and K2, and there are two K spots of heat energy resident in the standing wave in section L5, and these are indicated at K3 and K4.

The extremities of each of the extended toroidal electrode configurations described and claimed herein with a half wave or full wave configuration are indicated to be areas of low electric field charge and are areas carrying primary maximum current and minimum voltage. Also in no instance of a half wave configuration does an area of maximum current or ground electric potential exist at the approximate center convolution as is common in configurations adapted to induction heating by high frequency alternating current. Further, nothing in this specification indicates that there is a radical variable spacing or pitch between the convolutions of a half wave unit or for that matter the component parts of a full wave unit since this would introduce characteristics which could affect the placement or symmetry of the areas in which the K spot heating takes place in a dielectric within the convolutions.

The pitch of the convolutions is usually fairly symmetrical although this is not a pre-requisite for satisfactory operation. Further, the full wave extended toroidal electrode is designed to resonate at the frequency of an associated generating means of alternating current and the half wave toroid is designed to resonate at twice the frequency or one-half the wave length of the associated means of generating high frequency alternating currents. There need be no coverage in this specification of the Maxwellian displacement currents which tend to complete a ground image of the wave in the maintenance of the half wave mode, but these usually exist in air and between the structure and imaginary grounds at other points in space.

The heating effects described herein have multiple uses, not only for the heating of ordinary dielectrics but as well for particles associated with the elements of matter, other generally than metallic matter. The connotation and description herein, therefore should not limit the scope of this invention as to any one class of dielectric substance or particles, and we wish the term, dielectric substances or particles to include gases, even if they are not named or covered specifically. It might be pointed out, for example, that in heating matter consisting generally of a dielectric or a gas, this heating might in effect take the form of the displacement of an electron or electrons from their normal orbital relationship when an atom is ionized, excited or otherwise activated to an excited state by the high frequency field of force herein disclosed. The heating can take place in a piece of wood, in a solid or in the moisture content of a ceramic tile when being dried, an ionized gas when it be excited to laser action or a solid body such as a ruby or other crystal in solid form which when subjected to the action of the high frequency alternating current field of force excites atoms to laser action within the convolutions of an extended toroidal electrode configuration as herein described.

We have mentioned above that the excitation of atoms in the formation of ions is readily accomplished through excitation by the application to the atoms in solid or gaseous form of a high frequency alternating current field of force. We have in the course of experiments on the heating of materials within the structures herein disclosed inserted within the convolutions of the helices, tubes T, see all four figures, containing gases of various chemical compositions, such as hydrogen, helium, oxygen, argon and neon. In applying the high frequency alternating current field of force to the extended toroidal electrode configurations containing these gaseous materials in the tubes T, results in the immediate ionization of the gases within the areas in which the maximum K spot heating effects took place. The emission of light resulted when the gases of the types mentioned returned from the excited or ionized state to a ground state. We observed in this connection light of varying frequencies which emanated from the gases, occurred at places in the light spectrum resulting in colors normally to be anticipated from the ionization of these gases.

A mixture of helium and neon gases, for example, excited by a high frequency field of force will result in the emission of light which when properly directed results in a coherent beam of light commonly called a laser beam. We have placed within the toroidal electrode configuration herein described, tubes T containing gases of the various kinds above set forth and observed the resulting phenomena of the emission of light as a result of the return to ground state of the excited atoms of the various gases because of the ionization which took place when the extended toroidal configurations were coupled to and excited by a high frequency generator.

The tubes T shown in the drawing can also be used for conveying milk or other liquids which are to be heated by the toroidal coils.

A further difference between a condenser field as shown in our Patent No. 2,506,158, and a toroid field as shown in our present case is as follows: In a condenser field the areas of K spot heating generally parallel the faces of the electrodes forming the condenser plates. Therefore the movement of a dielectric through a condenser field and parallel with the condenser plates will cause the spaced apart heating K spots that lie between the condenser plates to heat the interior of the moving dielectric along interior planes in the dielectric that are spaced from each other and also spaced from the faces of the condenser plates. Other portions of the dielectric lying adjacent to the condenser plates and the central portion of the dielectric lying between the two interiorly K spot heated portions, will not be directly heated by the K spots and thus would escape being heated.

In the extended toroidal electrode field of the present case on the other hand, the dielectric moving parallel to the coil axis and being enclosed by the loops of the coils will be heated transversely throughout the cross section of the dielectric because the K spots in the toroidal configuration extend across the diameter of the coil helix. The movement of the dielectric through the toroidal configuration and generally along the axis of the convolutions of the helix will obviously pass through two K spots of heating if a one-half standing RF wave is on the helix and will pass through four K spots of heating if two one-half standing RF waves lie on the segmented helix. None of the dielectric will escape heat treatment by the K spots.

We claim:

1. In an apparatus for dielectric high frequency heating:
    (a) means for generating high frequency alternating current;
    (b) means for attaching thereto an electrode configuration comprising metallic convolutions;
    (c) the axis of which convolutions forms substantially a straight line; and
    (d) the length of which convolutions measures approximately the square root of 2 over two times the free space wave length of the said means of generating high frequency alternating current for each half-standing wave of radio frequency field established upon the said configuration.

2. An apparatus for dielectric high frequency heating within the convolutions of an extended segmented toroidal electrode configuration:
    (a) the axis of whose convolutions forms substantially a continuous straight line, dimensioned so that each of its adjacent halves support opposite "$e$" field charged half-standing waves of radio frequency energy from an associated means of radio frequency energy generation; and
    (b) wherein the respective halves are extremity connected units joined electronically at their near ends, which connection forms a common current antinodal boundary area between the said halves of the said extended toroidal electrode.

3. An apparatus for dielectric high frequency heating within the convolutions of a full standing wave extended toroidal electrode configuration:
    (a) the axis of the convolutions of which forms substantially a straight line;
    (b) the said configuration being composed of two separate halves;
    (c) the extremities of each half being galvanically connected and fed from an associated source of high frequency alternating current which
    (d) establishes half-standing waves of radio frequency energy at the frequency of the said associated source of high frequency alternating current on each of the said halves; and
    (e) where maximum "$e$" field charges are positioned at the approximate mid-convolution of each of the said half sections.

4. The step in a process of dielectric high frequency heating:
    (a) passing dielectric materials through the interior of convolutions of dual half-wave extended segmented toroidal electrode configurations;
    (b) each of which configurations are aligned so that the axis of their respective convolutions approximate straight lines, and form a part of a common approximate straight line;
    (c) each of which configurations have galvanically connected extremities, connecting a source of high frequency alternating current; and
    (d) each of which configurations has one of its end convolutions lying near, but not galvanically touching the opposite extremity of its associated half-wave configuration;
    (e) wherein the approximate center convolution of each of said dual configurations is the approximate position of maximum "$e$" field charges of a half-standing wave of high frequency energy at the oscillating frequency of the associated source of high frequency alternating current.

5. An electrode configuration comprising:
(a) metallic convolutions wound around an imaginary straight line axis and
(b) of sufficient diameter to accept the positioning of dielectric materials within the interior of the said convolutions;
(c) the length of which convolutions approximates the square root of 2 over two times the free space wave length of a high frequency alternating current oscillator associated therewith for each half-standing wave of radio frequency energy established upon said electrode.

6. An apparatus for ionizing gases within the convolutions of an extended toroidal electrode configuration:
(a) on which said configuration stands one or more half-waves of radio frequency energy from a source of high frequency alternating current associated therewith; and
(b) wherein the length of the convolutions of the said extended toroidal electrode configuration, the axis of which convolutions forms substantially a straight line, measure in length approximately the square root of 2 over two times the free space wave length of the associated generator of high frequency alternating current for each half-standing wave length on the said extended toroidal electrode configuration.

References Cited by the Examiner
UNITED STATES PATENTS

| | | | |
|---|---|---|---|
| 1,572,873 | 2/1926 | Allcutt | 13—27 |
| 2,506,158 | 5/1950 | Mann et al. | 219—10.41 X |
| 2,599,850 | 6/1952 | Mann et al. | 219—10.41 |
| 2,752,472 | 6/1956 | Emerson | 219—10.79 |
| 2,788,426 | 4/1957 | Thompson | 219—10.79 X |
| 2,856,296 | 10/1958 | Mann et al. | 219—10.79 X |
| 3,102,920 | 9/1963 | Sirons. | |

RICHARD M. WOOD, *Primary Examiner.*